United States Patent
Kinkade

(10) Patent No.: US 6,934,991 B2
(45) Date of Patent: Aug. 30, 2005

(54) ELECTRICIAN'S TOOL

(76) Inventor: Clifford A. Kinkade, Rte. 1, Box 126, City of Noble, Richland County, IL (US) 62868

( * ) Notice: Subject to any disclaimer, the term of this patent is extended or adjusted under 35 U.S.C. 154(b) by 0 days.

(21) Appl. No.: 10/874,768

(22) Filed: Jun. 23, 2004

(65) Prior Publication Data

US 2004/0255390 A1 Dec. 23, 2004

Related U.S. Application Data

(60) Provisional application No. 60/480,129, filed on Jun. 23, 2003.

(51) Int. Cl.$^7$ ................................ B25B 7/22
(52) U.S. Cl. ................ 7/137; 7/127; 7/144; 81/451
(58) Field of Search ............... 7/137, 127, 144; 81/451, 427

(56) References Cited

U.S. PATENT DOCUMENTS

| | | | | |
|---|---|---|---|---|
| 1,293,966 A | * | 2/1919 | Springer | 7/130 |
| 1,364,829 A | * | 1/1921 | Berg | 7/130 |
| D307,699 S | * | 5/1990 | Suganami | D8/52 |
| 4,953,248 A | * | 9/1990 | Trombetta | 7/107 |
| D326,596 S | * | 6/1992 | Trombetta | D8/55 |
| 5,575,029 A | * | 11/1996 | Simpson | 7/137 |
| 6,223,373 B1 | * | 5/2001 | Yeh | 7/127 |

* cited by examiner

Primary Examiner—Joseph J. Hail, III
Assistant Examiner—Alvin J Grant
(74) Attorney, Agent, or Firm—Gary K. Price, Esq.

(57) ABSTRACT

A combination electrician's tool which is substantially a pair of pliers having a first plier portion pivotally attached to a second plier portion. The first plier portion having a first handle and a first jaw, and the second plier portion having a second handle and a second jaw. The second plier further including a cutting edge in cooperation with the first plier, which cutting edge is used before cutting items such as, but not restricted to wire. The first and second jaw portions further include a hammer formed on the outside surface, such that the tool can be used as a hammer. The first and second jaws further define cooperating groove portions having cutting surfaces sized to cut varying sizes of wire and cable, including ROMEX multi-conductor cable.

16 Claims, 4 Drawing Sheets

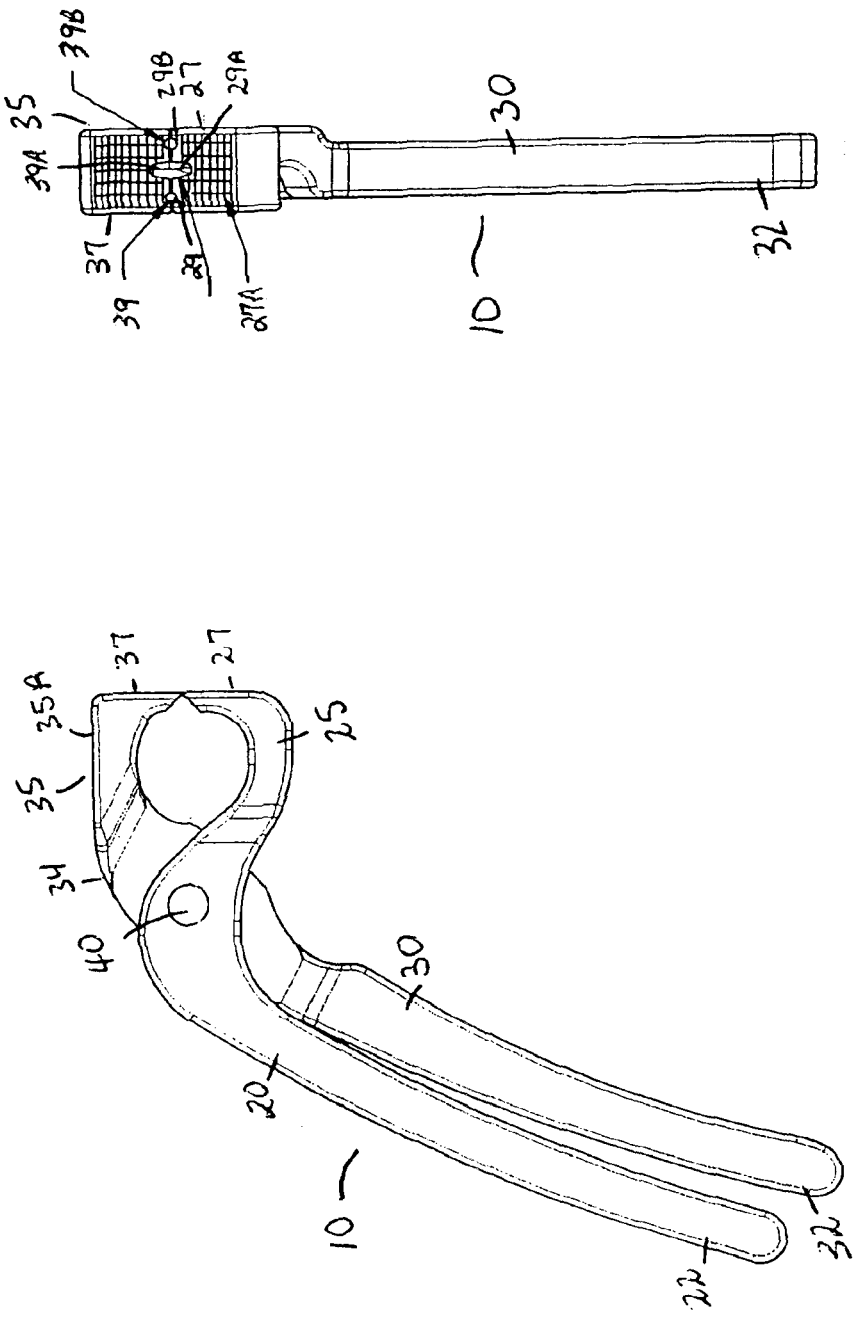

ELECTRICIAN'S TOOL

CROSS REFERENCES TO RELATED APPLICATIONS

U.S. Provisional Application for Pat. No. 60/480,129, filed Jun. 23, 2003, with title "Electrician's Tool" which is hereby incorporated by reference. Applicant claims priority pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not Applicable

BACKGROUND OF THE INVENTION

1. Field of the Invention

This invention relates to a combination tool and more particularly to an electrician's tool that combines a variety of functions not previously available in a single tool.

2. Brief Description of Prior Art

Workers such as, but not restricted to, electricians currently use a variety of tools to install cable and wiring. Carrying such a variety of tools is inconvenient and time consuming.

Prior art attempts at providing tools that combine a variety of functions include the following patents:

U.S. Pat. No. Des. 334,521, discloses a combination tool composed of two tool halves rotatably joined by a pivot pin. The tool further includes a hammer head and a standard nail removing claw, a crimper, insulated flared handles, two sets of gripping jaws, and a wire cutter.

U.S. Pat. No. 5,280,659, discloses a multi-purpose tool having four working areas each having a different pair of working edges. Each set of working edges perform a function different than that performed by the other three set of edges. The present invention differs significantly in design and further comprises a hammer function, gripping means, wire cutter and stripper means, including means for cutting ROMEX cable.

U.S. Pat. No. 4,953,248, discloses an electrician's compound tool comprising a hammer head, cutter blades, a series of wire strippers, a wire cutter, a knife, a crimper, a pair of blunt pliers, a bolt cutter, a claw and screw driver. '248 does not disclose a tool of the present invention that includes a means for cutting wire and cable of varying sizes and hardnesses, including ROMEX cable.

The various features of the combination of the present invention solve problems that are not solved by the prior art. For example, in the prior art, wire cable, such as ROMEX cable, had to be cut by different wire cutters having the appropriate width and hardness. The present invention's wire cutting means is of a width and hardness that allows wire and cable, such as ROMEX cable, of varying sizes and hardnesses to be cut with a single tool.

As will be seen from the subsequent description, the preferred embodiments of the present invention are improvements over the existing art of tools.

SUMMARY OF THE INVENTION

The present invention in the preferred embodiment is a tool that may be used as a wire stripper; to cut cable; to grip objects; and as a hammer. The tool of the present invention generally including a first plier, a second plier, and a pivot pin, wherein the first plier and the second plier are pivotally joined with the pivot pin. The first plier including a first handle portion and a first jaw portion opposite the first handle portion. The second plier including a second handle portion and a second jaw portion opposite the second handle portion. The second plier further includes a recess portion having a cutting edge that cooperates with the first plier for cutting items such as but not restricted to wire. The first and second jaw portions each further including a hammer face formed on the outside surface such that the tool can be used as a hammer. The first and second jaws further define cooperating groove portions sized to strip various sizes of wire and cable including, but not restricted to, ROMEX multi-conductor cable.

BRIEF DESCRIPTION OF THE DRAWINGS

FIGS. 1–7 illustrate alternate views of the preferred embodiment of the present invention, an electrician's tool.

DESCRIPTION OF THE PREFERRED EMBODIMENT

Figure 1:
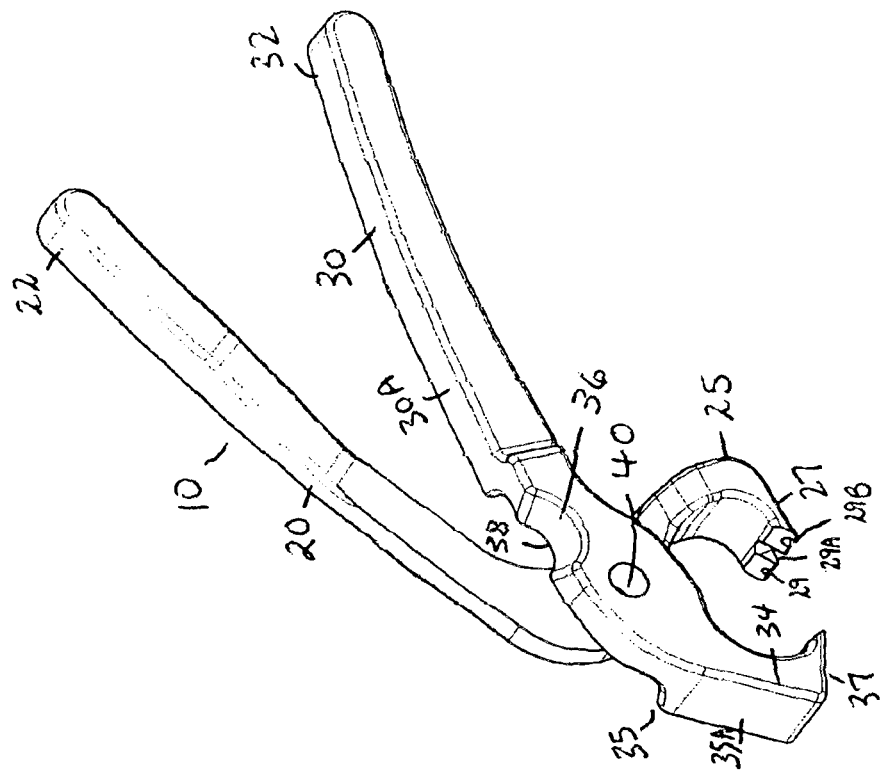
Figure 2:
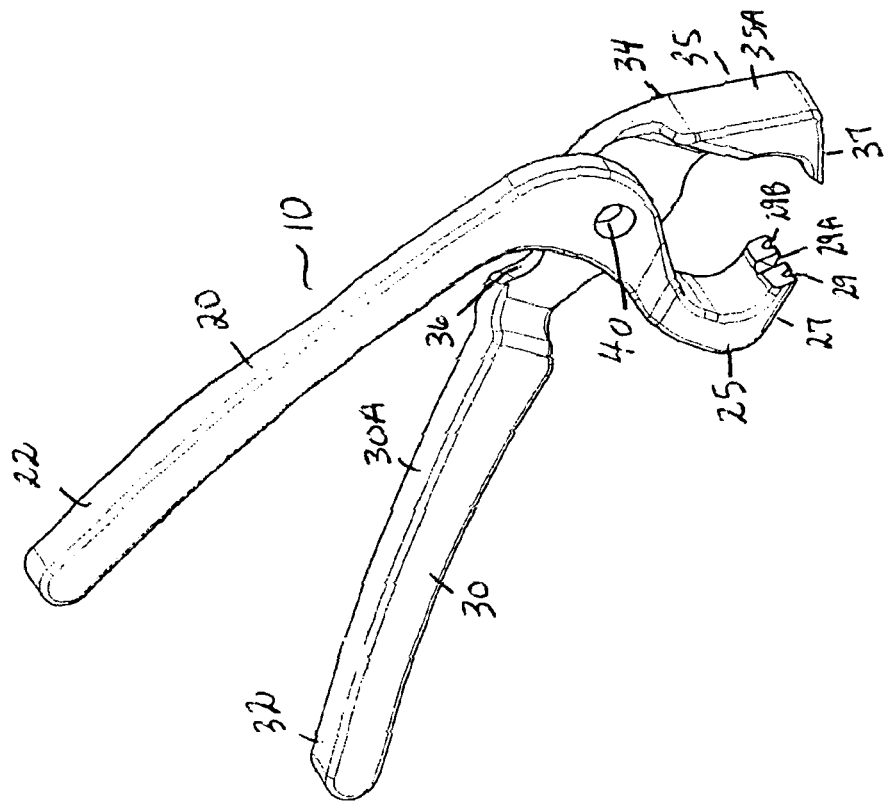
Figure 3:
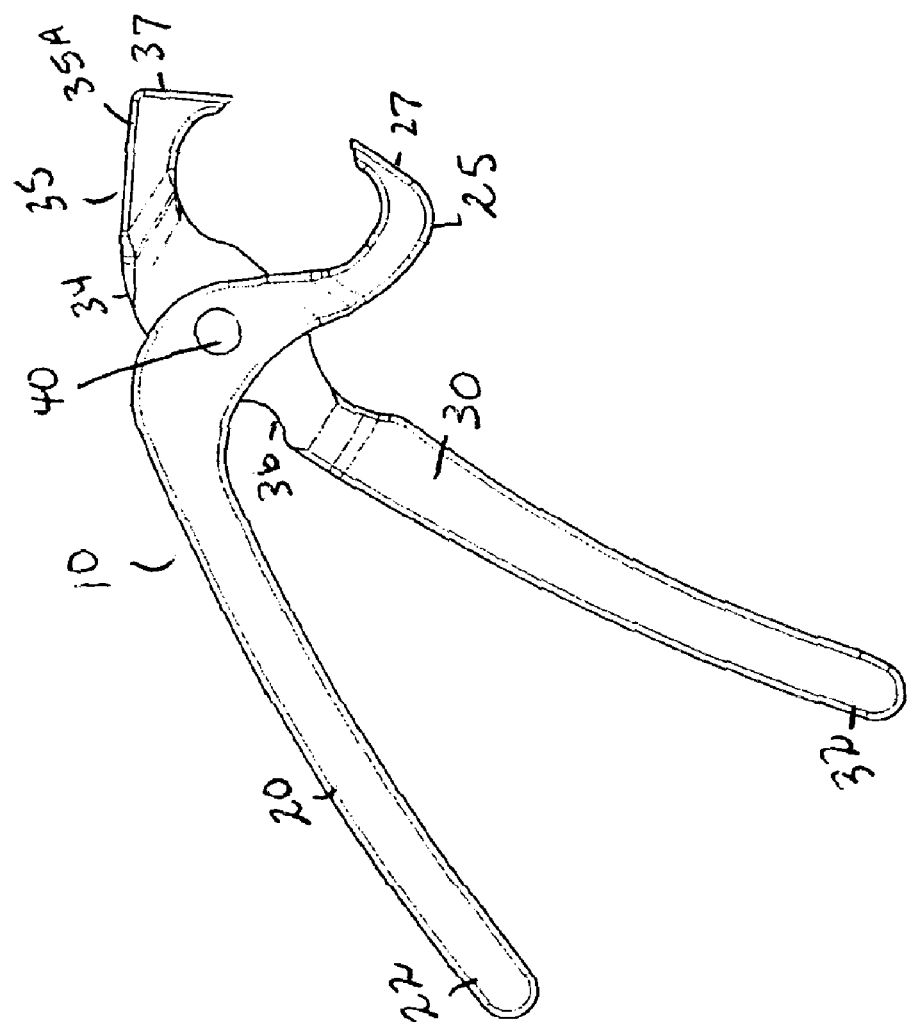

FIGS. 1–6 illustrate the preferred embodiment of an electrician's tool 10 made in accordance with the present invention. In particular, FIGS. 1–3 illustrate the tool 10 in an open position and, FIGS. 4–7 illustrate the tool 10 in a closed position as will be further discussed.

As shown in the drawings, the tool 10 generally includes an elongated first plier 20, an elongated second plier 30, and a pivot pin 40. The elongated first plier 20 includes a first handle portion 22 and a first jaw portion 25 opposite the first handle portion 22. The elongated second plier 30 includes a second handle portion 32 and a second jaw portion 35 opposite the second handle portion 32. The elongated first plier 20 and the elongated second plier 30 are pivotally joined with the pivot pin 40.

Figures 4, 5:
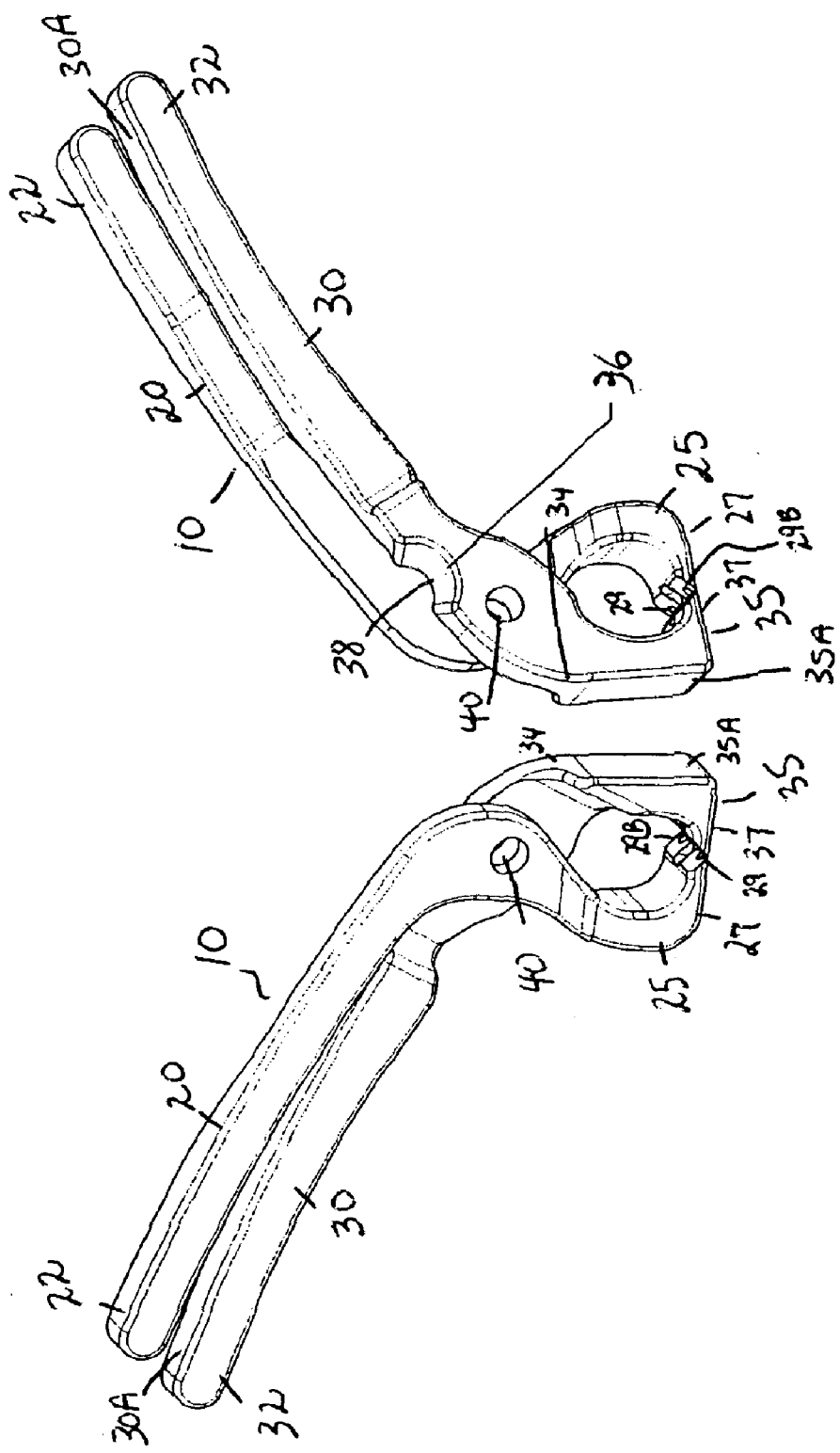

Referring to FIGS. 2 and 5, the second plier 30 further includes a recess 36 defining a cutting edge 38. The recess 36 is disposed on an upper surface 30A of the second plier 30, and positioned near the pivot pin 40 on the second handle portion 32. The cutting edge 38 runs parallel to the longitudinal axis of the second plier 30. The recess 36 and the cutting edge 38 cooperate with the first plier 20 for cutting items such as, but not restricted to wire. This alleviates the need to carry a wire cutter.

As shown in the drawings, an upper surface 34 of the second jaw 35 defines a hammer face 35A such that the tool 10 can be used as a hammer when the tool 10 is in the closed position. Similarly, the first jaw 25 and the second jaw 35 each further include a flat end surface 27, 37 respectively. The flat end surfaces 27, 37 can further be used as a hammer surface when the tool is in the closed position. As best shown in FIG. 7, the flat end surfaces 27, 37 having a substantially knurled surface 27A, 37A respectively, for driving nails and staples into wooden studs for example.

FIGS. 4 and 5 show the pliers 20, 30 are bent at nearly a 90 degree angle near the pivot pin 40 such that a person can grasp the first and second handle portions 22, 32 and the flat surfaces 27, 37 will be at nearly a perpendicular angle to the first and second handle portions 22, 32 such that the pliers 20, 30 will function as a hammer. The flat surfaces 27, 37 form a single planar hammer surface in the closed position of the tool 10. The angle in the pliers 20, 30 cause the hammer surfaces to be perpendicularly spaced from the handle portions 22, 32 to make the tool 10 ergonomically useful as a hammer. This alleviates the need to carry a hammer.

As best shown in FIGS. 1, 2, and 7, the first and second jaws 25, 35, each further define at least one cooperating first groove portions 29, 39, respectively, and at least one cooperating ROMEX strap or staple removal groove 29A, 39A, respectively. In the preferred embodiment, first and second jaws 25, 35 each further include an additional pair of cooperating second groove portions 29B, 39B, respectively. In this regard, the ROMEX removal groove disposed on each of the jaws 25, 35 is preferably defined between the first groove portions 29, 39 and the second groove portions 29B, 39B on each of the jaws 25, 35.

A cutting surface is further defined on the inner edges of the cooperating first groove portions 29, 39, the cooperating second groove portions 29B, 39B, and the cooperating removal groove 29A, 39A. The cutting surfaces can be sized to cut through wiring insulation while not harming a wire or conductor within the wiring insulation to allow the wire to be stripped of insulation. As shown in FIG. 7, the first and second groove portions and ROMEX removal groove 29A, 39A are disposed below the knurled surface 27A, 37A, respectively. Thus in use ROMEX removal groove 29A, 39A could be used to strip the insulation coating from the ROMEX multi-conductor wire cable and either first groove 29, 39 or second groove 29B, 39B could strip the insulation off individual conductor wires within the cable. Closing the tool 10 with a wire or cable in place will cut the insulation on the wire or cable, pulling the wire or cable relative to the tool 10 will then strip the insulation.

When the tool 10 is in the closed position, the cooperating first groove portions 29, 39, are preferably formed and sized to strip wires of typical range of widths in the electrical field. Likewise, the second groove portions 29B, 39B are preferably formed and sized to strip sizes of wire having a diameter that the first groove portions is not sized to strip. Tool 10 therefore alleviates the need to carry multiple wire strippers.

In the closed position, the cooperating grooves 29A, 39A are preferably formed and sized to strip larger sized wire and cable, including ROMEX cable. As such, the tool 10 of the present invention defines a plurality of cooperating stripper grooves 29, 39, and 29A, 39A, and 29B, 39B that permit the tool 10, when the jaws 25 and 35 are in the closed position, to strip a variety of sized wires. Each pair of stripper grooves of a different dimension, so that different wire diameters to be stripped can be accommodated.

In application, the wire to be stripped is placed within the selected stripper groove of either the first plier 20 or the second plier 30 while the tool 10 is in the open position. The wire preferably rests on the cutting edge of the selected stripper groove. The tool 10 pivots to the closed position by squeezing the handle portions 22, 32 together causing the cutting edge of the selected stripper groove of the first jaw 25 and the cooperating stripper groove of the second jaw 35 to cut into the insulation of the wire. The insulation is then stripped from the wire as is known in the art.

The strength of the grooves are sufficiently hard to allow the cutting surface of the inner edges of the grooves to cut wire and cable having a wide range of hardnesses.

In the closed position as shown in the drawings, the first and second jaws 25, 35 of the tool 10 further serve as gripping jaws designed for grabbing and pulling objects such as straps or staples. This allows the present invention 10 to securely grip straps, staples and the like without slipping or sliding free of the tool's 10 grip.

Although the description above contains many specificities, these should not be construed as limiting the scope of the invention but as merely providing illustrations of some of the presently preferred embodiments of this invention. For example, while the above description refers to the present invention for use by electricians, it is obvious that the present invention is useful for other tradesmen including cable or wire installers.

It will be obvious to those skilled in the art that modifications may be made to the embodiments described above without departing from the scope of the present invention. Thus the scope of the invention should be determined by the appended claims in the formal application and their legal equivalents, rather than by the examples given.

I claim:

1. A combination electrician's tool, comprising:
    a first plier including a first handle and a first jaw opposite the first handle,
    a second plier including a second handle and a second jaw opposite the second handle, a first cutting edge disposed on an upper surface of the second plier, said first cutting edge in cooperation with the first plier for cutting,
    a pivot pin for rotatably joining said first plier and second plier,
    wherein the second jaw further defines a first portion of a hammer surface and the first jaw defines a second portion of a hammer surface such that a planar hammer surface is formed when the first and second jaws are in a closed position,
    wherein the first and second jaws further define a plurality of cooperating grooves, each said cooperating grooves including a second cutting edge disposed on an inner edge of said cooperating groove to strip insulation from wire.

2. The tool as recited in claim 1, wherein said first and second pliers are bent adjacent said pivot such that said hammer surface is perpendicularly spaced from said first and second handles.

3. The tool as recited in claim 1, wherein at least one of said cooperating grooves is sized to strip insulation from a cable containing several conductor wires and at least a second of said cooperating grooves is sized to strip at least one of said several conductor wires.

4. The tool as recited in claim 1, wherein first and second jaws define a gripping surface.

5. The tool as recited in claim 1, wherein said first and second handles lie adjacent to each other in a closed position of said tool such that both said first and said second handles can be gripped when said tool is used as a hammer.

6. A combination electrician's tool comprising:
    a first plier including a first handle and a first jaw, a second plier including a second handle and a second jaw,
    a pivot pin for rotatably joining said first plier and second plier,
    a hammer means disposed on each of the first and second jaws for driving an object,
    cutting means disposed on an upper surface of said second plier for cutting,
    stripper means disposed on a lower edge of said first and second jaws for stripping wire, and
    gripping means disposed on said lower edge of said first and second jaws for gripping, wherein said hammer means includes a planar hammer surface formed by said first and second jaws in a closed position of said tool.

7. The tool as recited in claim 6, wherein said first and second handles are held together in the closed position of said tool.

8. The tool as recited in claim 6, wherein a cable stripper and a wire stripper are formed in said planar hammer surface in the closed position of said tool.

9. The tool as recited in claim 6, wherein said cutting means includes a cutting surface and wherein said first handle holds a wire or cable as it is cut by said cutting surface.

10. The tool as recited in claim 6, wherein said gripping means includes a surface on each of said first and said second jaws that come together in said closed position of said tool.

11. A tool for use in wiring, said tool comprising:

a first plier and a second plier pivotably connected together, a first jaw formed on said first plier, a second jaw formed on said second plier, said tool having a closed position wherein a portion of said jaws are brought together and an open position wherein said portion of said jaws are spaced apart, each of said first and second jaws including a portion of a hammer surface, each of said jaws including a portion of a wire stripper, each of said jaws including a portion of a cable stripper, and each of said jaws including a portion of a grip such that the hammer surface, the wire stripper, the cable stripper and the grip are formed in the closed position of the tool.

12. The tool as recited in claim 11, wherein said first plier includes a first handle and said second plier includes a second handle.

13. The tool as recited in claim 12, wherein said second plier includes a cutting surface.

14. The tool as recited in claim 13, wherein said first and second pliers are bent adjacent to a pivot pin connecting the first and second pliers.

15. The tool as recited in claim 14, wherein said hammer surface is knurled.

16. The tool as recited in claim 15, wherein said first and second handles are brought together in contact in said closed position of said tool.

* * * * *